(12) United States Patent
Ding et al.

(10) Patent No.: US 12,388,373 B2
(45) Date of Patent: Aug. 12, 2025

(54) SWITCH MODE POWER CONVERTER WITH SYNCHRONOUS RECTIFIER IMPLEMENTING ADAPTIVE TURN-OFF VOLTAGE

(71) Applicant: Alpha and Omega Semiconductor International LP, Toronto (CA)

(72) Inventors: Yu Ding, Shanghai (CN); Sitthipong Angkititrakul, Dublin, CA (US); Jian Yin, San Ramon, CA (US)

(73) Assignee: Alpha and Omega Semiconductor International LP, Toronto (CA)

( * ) Notice: Subject to any disclaimer, the term of this patent is extended or adjusted under 35 U.S.C. 154(b) by 242 days.

(21) Appl. No.: 18/053,036

(22) Filed: Nov. 7, 2022

(65) Prior Publication Data
US 2024/0154535 A1    May 9, 2024

(51) Int. Cl.
*H02M 3/335* (2006.01)
*H02M 1/36* (2007.01)

(52) U.S. Cl.
CPC ......... *H02M 3/33592* (2013.01); *H02M 1/36* (2013.01)

(58) Field of Classification Search
CPC ............ H02M 3/00; H02M 3/22; H02M 3/24; H02M 3/28; H02M 3/315; H02M 3/3155;
(Continued)

(56) References Cited

U.S. PATENT DOCUMENTS 5,206,800 A    4/1993  Smith
5,402,329 A    3/1995  Wittenbreder, Jr.
(Continued)

FOREIGN PATENT DOCUMENTS

CN    110429801 A    11/2019

OTHER PUBLICATIONS

M. T. Zhang, M. M. Jovanovic and F. C. Lee, "Design considerations and performance evaluations of synchronous rectification in flyback converters," Applied Power Electronics Conference and Exposition, 1997, APEC '97 Conference Proceedings 1997., Twelfth Annual, Atlanta, GA, 1997, pp. 623-630 vol. 2.
(Continued)

*Primary Examiner* — Thienvu V Tran
*Assistant Examiner* — Carlos O Rivera-Perez

(57) ABSTRACT

A power converter incorporating a synchronous rectifier implements adaptive turn-off voltage control for fast turn-off of the synchronous rectifier in the continuous conduction mode. In some embodiments, the synchronous rectifier turn off detection threshold is adaptively changed as a function of the detected operation mode of the power converter. In response to detecting the power converter being operated in the continuous conduction mode, the synchronous rectifier turn off detection threshold is set to a voltage value farther away from zero volt as compared to the nominal turn off detection threshold. In this manner, the synchronous rectifier can be turned off earlier while in the continuous conduction mode. When the synchronous rectifier can be turned off quickly, large reverse current or negative current as well as large drain voltage spike at the synchronous rectifier can be avoided. The reliability of the synchronous rectifier and the power converter is improved.

20 Claims, 9 Drawing Sheets

(58) Field of Classification Search
CPC .......... H02M 3/335; H02M 3/33507; H02M 3/33515; H02M 3/33523; H02M 3/3353; H02M 3/33538; H02M 3/33546; H02M 3/33553; H02M 3/33569; H02M 3/33571; H02M 3/33573; H02M 3/33576; H02M 3/33584; H02M 3/33592; H02M 1/0003; H02M 1/0009; H02M 1/0025; H02M 1/0029; H02M 1/0032; H02M 1/0035; H02M 1/0038; H02M 1/0058; H02M 1/34–348; H02M 1/36; H02M 1/38; H02M 1/385; H02M 1/08; Y02B 70/10
USPC ..... 363/15–21.18, 44–48, 52, 53, 56.12, 89, 363/123, 131–134; 323/266, 271–275, 323/280–287, 351
See application file for complete search history.

(56) References Cited

U.S. PATENT DOCUMENTS

| | | | |
|---|---|---|---|
| 5,757,626 A | 5/1998 | Jovanovic et al. | |
| 5,991,171 A | 11/1999 | Cheng | |
| 5,991,172 A | 11/1999 | Jovanovic et al. | |
| 6,198,638 B1 | 3/2001 | Lee | |
| 7,876,584 B2 | 1/2011 | Havanur | |
| 8,067,973 B2 | 11/2011 | Bakker | |
| 10,027,235 B2* | 7/2018 | Choi | H02M 1/38 |
| 10,615,700 B1* | 4/2020 | Moon | H02M 3/3376 |
| 2006/0013022 A1 | 1/2006 | Jitaru | |
| 2015/0280573 A1 | 10/2015 | Gong et al. | |
| 2016/0111961 A1 | 4/2016 | Balakrishnan et al. | |
| 2016/0294292 A1 | 10/2016 | Huang et al. | |
| 2016/0329819 A1 | 11/2016 | Chen et al. | |
| 2016/0373019 A1* | 12/2016 | Hsu | H02M 3/33592 |

OTHER PUBLICATIONS

A. M. Connaughton, K. Krischan, K. K. Leong and A. Muetze, "New control concept for soft-switching Flyback converters with very high switching frequency," 2016 IEEE Applied Power Electronics Conference and Exposition (APEC), Long Beach, CA, USA, 2016, pp. 355-361.

* cited by examiner

SWITCH MODE POWER CONVERTER WITH SYNCHRONOUS RECTIFIER IMPLEMENTING ADAPTIVE TURN-OFF VOLTAGE

FIELD OF THE INVENTION

The invention relates to switching regulator circuits and methods and, in particular, to a switching regulator with synchronous rectifier implementing adaptive turn-off voltage for fast turn-off in continuous conduction mode.

BACKGROUND OF THE INVENTION

Power converters are used in a wide range of electronic applications to convert an AC voltage to a DC voltage or to convert DC voltages from one voltage value to another. Commonly used power converters include the switch mode power supplies or switch mode converters, also referred to as switching regulators or DC-DC converters. A switching regulator provides power supply function through low loss components such as capacitors, inductors, and transformers, and power switches that are turned on and off to transfer energy from the input to the output in discrete packets. A feedback control circuit is used to regulate the energy transfer to maintain a constant output voltage within the desired load limits of the circuit.

The flyback converter is one type of switch mode power converter with applications in electronic devices, such as televisions or computers, or mobile device chargers. Flyback converters also have applications in high-voltage supplies in electronic equipment, such as televisions or monitors.

The flyback converter is an isolated power converter that is commonly used in both AC-to-DC and DC-to-DC conversion with galvanic isolation between the input and the one or more outputs. More specifically, the flyback converter is a buck-boost converter with the inductor split to form a transformer, so that the voltage ratios are multiplied with an additional advantage of isolation. Synchronous rectification is often applied to replace the diode rectifier to improve efficiency. FIG. 1 is an example of a flyback converter using synchronous rectification. As shown in FIG. 1, a typical construction of the flyback converter includes a primary switch (SW) coupled to the primary transformer winding of a transformer Lm and a synchronous rectifier switch (SR) coupled to the secondary transformer winding of the transformer Lm. The input voltage $V_{IN}$ is provided across the primary winding and the primary switch. The primary switch is controlled by a control voltage $V_{GS}$ to turn on and off to conduct a primary current Ipri. The primary switch and the synchronous rectifier are complementary in operation with one switch being turned on while the other switch is turned off. The conduction periods of the primary switch SW and the synchronous rectifier SR do not overlap. The current flowing on the secondary side, referred to as the secondary current Isec, charges an output capacitor C3 to provide the output voltage Vo. In some cases, active clamping may be implemented at the primary side to clamp the voltage at the drain terminal of the primary switch SW when the primary switch SW is turned off.

FIG. 2 illustrates exemplary signals waveforms for operating the flyback converter of FIG. 1 in a constant frequency, continuous-conduction-mode (CF CCM). FIG. 3 illustrates exemplary signals waveforms for operating the flyback converter of FIG. 1 in a constant frequency, discontinuous-conduction-mode (CF DCM). The flyback converter of FIG. 1 and the operation modes of FIGS. 2 and 3 are described in detail in the paper by M. T. Zhang, M. M. Jovanovic and F. C. Lee, "Design considerations and performance evaluations of synchronous rectification in flyback converters," *Applied Power Electronics Conference and Exposition*, 1997, APEC '97 Conference Proceedings 1997, pp. 623-630 vol. 2. In short, when operated in the CCM operation mode, the secondary current Isec does not go to zero current value before the start of the next switching cycle (primary switch SW turns on), as shown in FIG. 2. On the other hand, when operated in the DCM operation mode, the secondary current Isec decreases to zero current value before the start of the next switching cycle, as shown in FIG. 3.

In particular, when the power converter with synchronous rectifier is operated in the continuous-conduction-mode, the secondary current does not decrease to zero before the next switching cycle but rather the secondary current flowing in the synchronous rectifier will go to zero when the primary switch SW is turned on. In practice, when the synchronous rectifier is signaled to be turned off, propagation delay and gate driver discharge time result in a certain amount of delay in the gate drive voltage $V_{GS}$ actually decreasing to a voltage level to turn off the synchronous rectifier. Secondary reverse current can result when the synchronous rectifier is turned off after the secondary current crosses zero current. In practice, if the synchronous rectifier is not turned off fast enough, a large reverse current can result which can lead to undesirably high drain-to-source voltage spike across the synchronous rectifier, which can impact the reliability of the synchronous rectifier device and the power converter in general.

SUMMARY OF THE INVENTION

The present disclosure discloses a power converter with adaptive turn off control for the synchronous rectifier, substantially as shown in and/or described below, for example in connection with at least one of the figures, as set forth more completely in the claims.

In some embodiments, a method of operating a power converter incorporating a synchronous rectifier and receiving an input voltage and providing an output voltage includes: detecting a start of a synchronous rectifier (SR) conduction cycle; detecting a gate voltage at a gate terminal of the synchronous rectifier near an end of the SR conduction cycle; in response to the detected gate voltage being less than a gate voltage target, selecting a first SR turn off detection voltage as the SR turn off detection threshold; in response to the detected gate voltage being great than or equal to the gate voltage target, selecting a second SR turn off detection voltage as the SR turn off detection threshold, the first and second SR turn off detection voltages being negative voltage values and the first SR turn off detection voltage is closer to zero volt than the second SR turn off detection voltage; in response to the synchronous rectifier being turned off in response to the drain voltage of the synchronous rectifier reaching the SR turn off detection threshold, storing the SR conduction time of the current SR conduction cycle; and in response to the SR turn off detection threshold being set to the second SR turn off detection voltage, resetting the SR turn off detection threshold to the first SR turn off detection voltage.

In another embodiment, a power converter includes an input terminal receiving an input voltage and an output terminal providing an output voltage; a synchronous rectifier coupled to the output terminal; a controller coupled to generate a gate voltage to drive a gate terminal of the synchronous rectifier over multiple synchronous rectifier (SR) conduction cycles. The controller detects a gate voltage at the gate terminal of the synchronous rectifier near an end of each SR conduction cycle. The controller set a SR turn off detection threshold to a first voltage in response to the detected gate voltage having a value less than a gate voltage target and set the SR turn off detection threshold to a second voltage in response to the detected gate voltage having a value greater than the gate voltage target. The first and second voltages are negative voltage values and the first voltage is closer to zero volt than the second voltage. The controller uses the SR turn off detection threshold to determine the turning off of the synchronous rectifier. In response to the controller signaling the synchronous rectifier to turn off in response to the SR turn off detection threshold, the controller reset the SR turn off detection threshold to the first voltage in the case the SR turn off detection threshold has been set to the second voltage.

These and other advantages, aspects and novel features of the present invention, as well as details of an illustrated embodiment thereof, will be more fully understood from the following description and drawings.

BRIEF DESCRIPTION OF THE DRAWINGS

Various embodiments of the invention are disclosed in the following detailed description and the accompanying drawings. Although the drawings depict various examples of the invention, the invention is not limited by the depicted examples. It is to be understood that, in the drawings, like reference numerals designate like structural elements. Also, it is understood that the depictions in the figures are not necessarily to scale.

DETAILED DESCRIPTION OF THE INVENTION

A power converter incorporating a synchronous rectifier implements adaptive turn-off voltage control for fast turn-off of the synchronous rectifier in the continuous conduction mode. In some embodiments, the synchronous rectifier turn off detection threshold is adaptively changed as a function of the detected operation mode of the power converter. In response to detecting the power converter being operated in the continuous conduction mode, the synchronous rectifier turn off detection threshold is set to a voltage value farther away from zero volt as compared to the nominal turn off detection threshold. In this manner, the synchronous rectifier can be turned off earlier while in the continuous conduction mode. When the synchronous rectifier can be turned off quickly, large reverse current or negative current as well as large drain voltage spike at the synchronous rectifier can be avoided. The reliability of the synchronous rectifier and the power converter is improved.

In the present embodiment, the power converter is a flyback converter including a synchronous rectifier coupled to the secondary winding of the transfer. In other embodiments, the power converter can be any other types of switch mode power supplies incorporating the use of a synchronous rectifier. For example, the power converter can be a boost or buck-boost converter, without the use of a transformer, or any DC-DC converters, or an LLC SSR converter, or any power converter that uses detection of the synchronous rectifier voltage. In the following description, the flyback converter is used as an example of illustrating the implementation of the adaptive turn-off voltage control. The use of a flyback converter as the power converter is illustrative only and not intended to be limiting.

Figure 1:
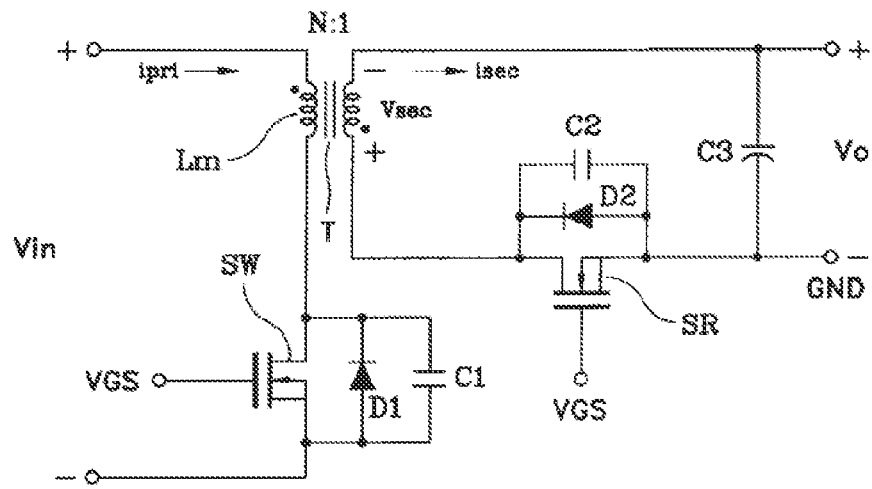
FIG. 1 is an example of a flyback converter using synchronous rectification.
Figure 2:
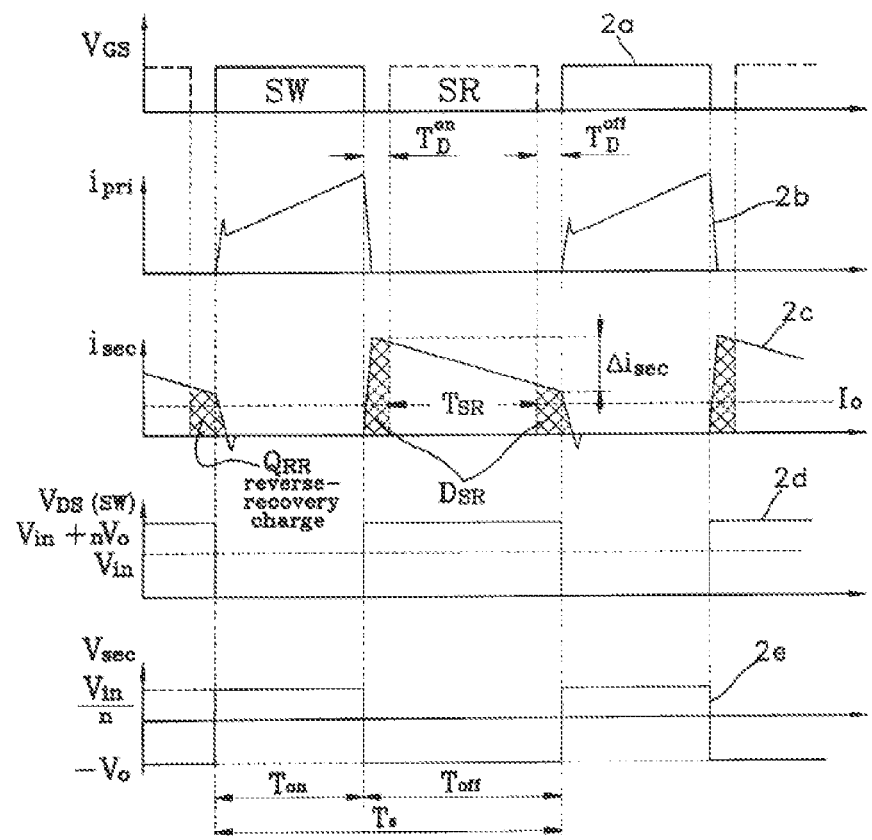
FIG. 2 illustrates exemplary signals waveforms for operating the flyback converter of FIG. 1 in a constant frequency, continuous-conduction-mode (CF CCM).
Figure 3:
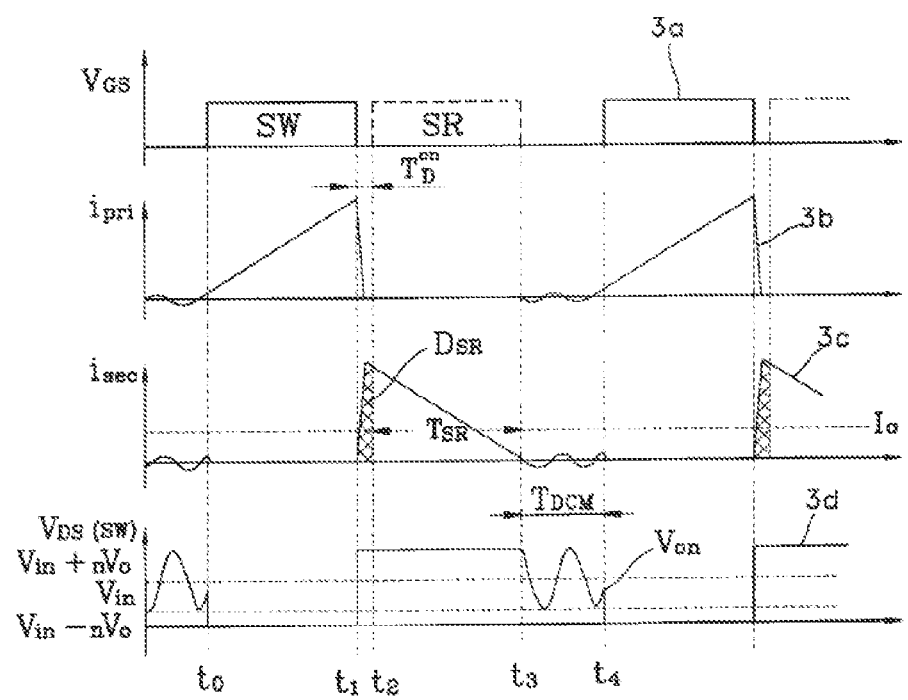
FIG. 3 illustrates exemplary signals waveforms for operating the flyback converter of FIG. 1 in a constant frequency, discontinuous-conduction-mode (CF DCM).
Figure 4:
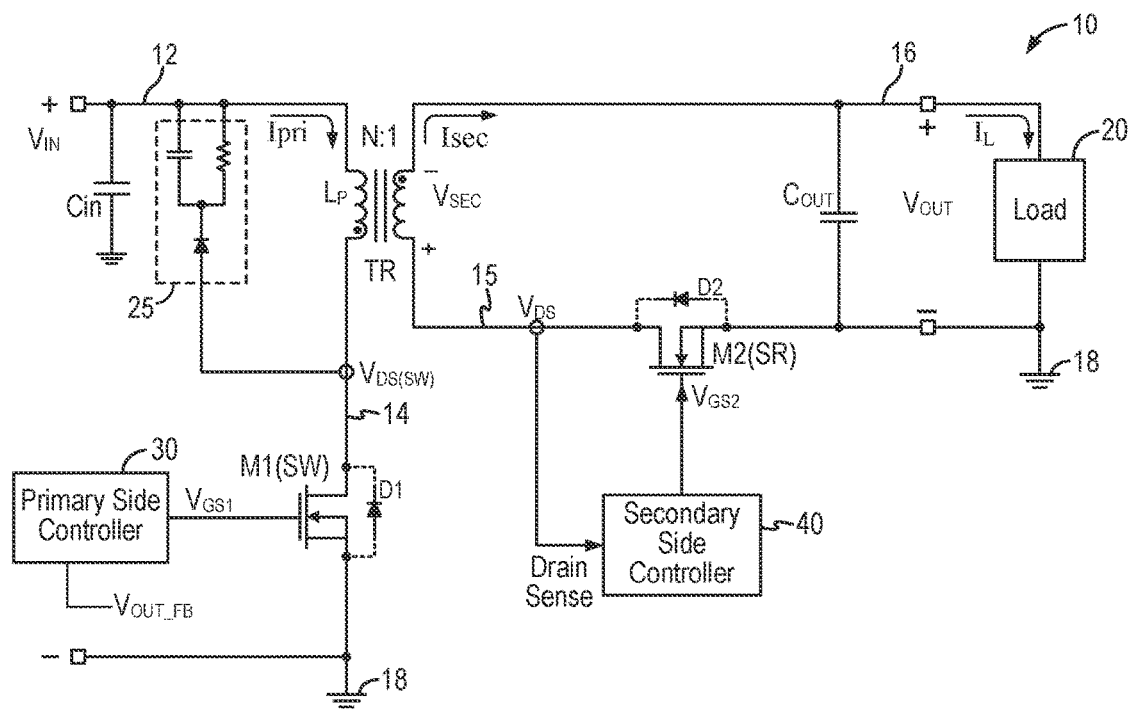
FIG. 4 is a schematic diagram of a flyback converter in embodiments of the present invention.

FIG. 4 is a schematic diagram of a flyback converter in embodiments of the present invention. Referring to FIG. 4, a flyback converter 10 includes a primary switch M1 (SW) coupled to the primary transformer winding of a transformer $L_P$ and a synchronous rectifier switch M 2 (SR) coupled to the secondary transformer winding of the transformer $L_P$. The input voltage $V_{IN}$ is coupled across the primary winding and the primary switch, between the input voltage node 12 and the ground node 18. An input decoupling capacitor Cin may be coupled to the input voltage node 12. The primary switch is controlled by a control voltage $V_{GS1}$ to turn on and off to conduct a primary current Ipri flowing in the primary transformer winding. The synchronous rectifier switch is controlled by a control voltage $V_{GS2}$ to turn on and off to conduct a secondary current Isec flowing in the secondary transformer winding. In the present description, the term "primary current" refers to the current flowing in the primary transformer winding and the terms "secondary current" and "synchronous rectifier current" are both used to refer to the current flowing in the secondary transformer winding of the transformer $L_P$, which is also referred to as the drain current of the synchronous rectifier. An output capacitor $C_{OUT}$ is coupled across the secondary winding and the synchronous rectifier, that is, between the output node 16 and the ground node 18. An output voltage $V_{OUT}$ is generated at the output node 16 to drive a load 20. In some embodiments, a passive clamping circuit 25 may be provided at the primary side to clamp the voltage at the drain terminal (node 14) of the primary switch M1 when the primary switch M1 is turned off.

In embodiments of the present invention, the primary switch M1 and the synchronous rectifier M2 are power switches, typically MOSFET devices. In the present embodiment, both the primary switch M1 and the synchronous rectifier M2 are constructed using NMOS transistors. The NMOS transistor of primary switch M1 has a drain terminal coupled to the transformer $L_P$ (node 14), a source terminal coupled to ground (node 18) and a gate terminal driven by the control voltage $V_{GS1}$. As an NMOS transistor, the primary switch M1 also has associated parasitic body diode D1 across the drain and source terminal of the transistor. In the present illustration, the body diode D1 are shown as being connected in dotted lines across NMOS switch M1 to indicate that the body diode D1 is a parasitic diode only and not an added diode element. At the secondary side, the NMOS transistor of synchronous rectifier switch M2 has a drain terminal coupled to the transformer $L_P$ (node 15), a source terminal coupled to ground (node 18) and a gate terminal driven by the control voltage $V_{GS2}$. As an NMOS transistor, the synchronous rectifier switch M2 has associated parasitic body diode D2 across the drain and source terminal of the transistor M2. Again, the body diode D2 is shown as being connected in dotted line across NMOS switch M2 to indicate that the diode D2 is a parasitic element formed as part of the NMOS transistor structure. In the present description, the secondary current is also referred to as the drain-to-source current $I_{DS}$ (or "drain current $I_{DS}$") of the MOSFET switch as the synchronous rectifier.

As thus configured, the primary switch M1 and the synchronous rectifier M2 are each driven by respective controller circuits to control the on and off operations of the switches. Specifically, a primary side controller 30 is coupled to drive the gate terminal of the primary switch M1 and a secondary side controller 40 is coupled to drive the gate terminal of the synchronous rectifier M2. The primary side controller 30 and the secondary side controller 40 can be constructed in various manner based on the control scheme selected for the flyback converter 10. In other words, the flyback converter 10 is a power stage and different control schemes can be used to control the flyback converter power stage. In operation, the switching of the primary switch is synchronized to the switching of the synchronous rectifier. In most implementations, either the primary side controller is the master controller with the secondary side controller being the slave or the secondary side controller is the master controller with the primary side controller being the slave. The master controller is usually implemented as a PWM controller. Examples of control schemes that can be used in the flyback converter 10 includes voltage mode control, peak current mode control and input voltage feed-forward control. Each of the control schemes uses different feedback signals to control and maintain a constant output voltage and to provide load regulation. The specific implementation of the control schemes in the flyback converter 10 is not critical to the practice of the present invention. One of ordinary skill in the art would appreciate that the adaptive turn-off voltage control can be applied in any of the control schemes to enable fast turn off of the synchronous rectifier in the continuous conduction mode. In the present illustration, a primary side controller and a secondary side controller are provided. In other embodiments, the primary side controller and a secondary side controller can be constructed as a single controller or control circuit generating the control signals for the primary switch and the synchronous rectifier switch.

In one example, the flyback converter power stage implements a control scheme with the secondary side being the master controller. In that case, the secondary side controller is a PWM controller configured to regulate the output voltage $V_{OUT}$. Alternately, the flyback converter power stage may be implemented with the primary side controller being the master controller. In that case, the primary side controller includes a PWM controller configured to regulate the output voltage $V_{OUT}$, such as through a feedback voltage $V_{OUT\_FB}$. The secondary side controller includes logic circuits to control the synchronous rectifier in response to the detected drain voltage $V_{DS}$ at the drain terminal of the synchronous rectifier MOSFET.

Figure 5:
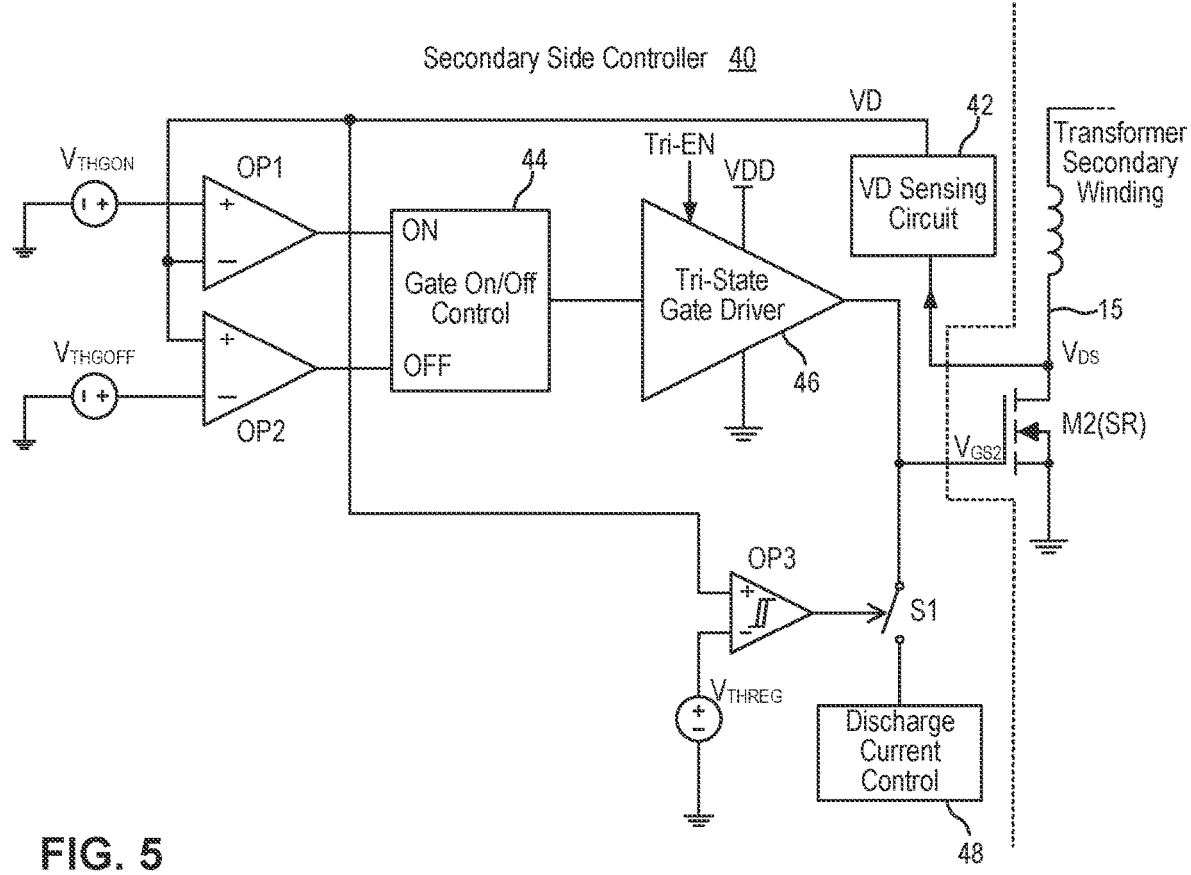
FIG. 5 is a schematic diagram of a secondary side controller in the flyback converter of FIG. 4 in embodiments of the present invention.

FIG. 5 is a schematic diagram of a secondary side controller in the flyback converter of FIG. 4 in embodiments of the present invention. Referring to FIG. 5, a secondary side controller 40 for generating the gate voltage $V_{GS2}$ to control the synchronous rectifier MOSFET M2 includes a drain voltage VDS sensing circuit 42 for sensing the drain voltage $V_{DS}$ of the synchronous rectifier M2. The sensed or detected drain voltage is coupled to a pair of operational amplifier OP1 and OP2, to be compared with respective detection threshold voltages to generate the gate on/off control signal for the synchronous rectifier M2. In particular, the operational amplifier OP1 compares the sensed drain voltage (at the negative input terminal) to a SR turn on detection voltage $V_{THGON}$ (at the positive input terminal) to determine when the synchronous rectifier M2 should be turned on and the operational amplifier OP2 compares the sensed drain voltage (at the positive input terminal) to a SR turn off detection voltage $V_{THGOFF}$ (at the negative input terminal) to determine when the synchronous rectifier M2 should be turned off. In this operation regime, the sensed drain voltage VD has a negative voltage value and the SR turn on detection voltage $V_{THGON}$ as well as the SR turn off detection voltage $V_{THGOFF}$ are both negative voltage values. The secondary side controller 40 includes a gate on/off control logic circuit 44 which receives the output signals from the operational amplifiers OP1 and OP2 and generate the on/off control signal. The on/off control signal is coupled to a tri-state gate driver 46, which when enabled by the enable signal Tri-EN, provides the gate voltage $V_{GS2}$ to drive the gate terminal of the synchronous rectifier M2. In the present example, the secondary side controller 40 further includes an operational amplifier OP3 for comparing the sensed drain voltage (at the positive input terminal) to a regulation threshold voltage $V_{THREG}$ (at the negative input terminal). When the sensed drain voltage reaches the regulation threshold voltage $V_{THREG}$, the operational amplifier OP3 closes switch S1 to allow a discharge current control circuit 48 to discharge the gate voltage $V_{GS2}$ in a controlled manner, as will be explained in more detail below.

The flyback converter 10 may be operated in the discontinuous conduction mode or continuous conduction mode. When operated in the continuous conduction operation mode, the secondary current Isec does not go to zero current value before the start of the next switching cycle (primary switch M1 turns on). On the other hand, when operated in the discontinuous conduction operation mode, the secondary current Isec decreases to zero current value before the start of the next switching cycle. In embodiments of the present invention, the secondary side controller 40 includes an adaptive turn-off voltage control circuit to modify the turn off voltage of the synchronous rectifier when operating in the continuous conduction mode, as will be explained in more detail below.

The general operation of the flyback converter 10 will now be described. Referring to FIGS. 4 and 5, the flyback converter 10 can be controlled using various control schemes. Regardless of the control scheme being used, the primary switch SW (M1) and the synchronous rectifier SR (M2) are complementary in operation with one switch being turned on while the other switch is turned off. The conduction periods of the primary switch SW and the synchronous rectifier SR do not overlap. When the primary switch SW is turned on, the primary winding of the transformer $L_P$ is connected to the input voltage $V_{IN}$ and the primary current Ipri increases linearly as the magnetic flux in the transformer increases. Energy is stored in the transformer $L_P$. At this time, the voltage $V_{SEC}$ induced in the secondary winding has a reverse polarity relative to the primary winding to cause the body diode D2 of the synchronous rectifier SR to be reversed biased. No secondary current Isec flows and the charge stored on the output capacitor $C_{OUT}$ supplies the load 20. With the primary switch SW turned on, the drain to source voltage $V_{DS(SW)}$ of the primary switch SW, at node 14, is at or near zero volts. Meanwhile, the secondary voltage $V_{SEC}$ of the synchronous rectifier SR (node 15), which is also the drain-to-source voltage $V_{DS(SR)}$ or $V_{DS}$ of the synchronous rectifier, is driven to a positive voltage being a ratio of the input voltage $V_{IN}$.

After the on period of the primary switch expires, the primary switch is turned off and the synchronous rectifier is turned on after a non-overlapping period. When the primary switch is turned off, the primary current Ipri decreases and the magnetic flux drops. The voltage across the secondary winding reverses so that the secondary voltage has a positive polarity at the dotted terminal, or negative polarity at the drain of the synchronous rectifier (node 15), to cause the body diode D2 of the synchronous rectifier SR to become forward biased. As a result, current flows through the secondary winding as the secondary current Isec. The secondary current Isec is also the drain-to-source current or drain current of the synchronous rectifier. The secondary current Isec increases to a peak current value. The synchronous rectifier SR is turned on after the non-overlapping period to conduct the secondary current Isec and to aid in the transfer of the stored energy from the transformer core to the output capacitor $C_{OUT}$. The output capacitor $C_{OUT}$ is recharged and supplies the load 20. The output voltage $V_{OUT}$ (node 16) is sustained by the charge on the output capacitor $C_{OUT}$. When the primary switch SW is turned off, the drain to source voltage $V_{DS(SW)}$ of the primary switch SW (node 14) swings to a high voltage value. In some examples, a voltage clamping circuit, such as the passive clamping circuit 25, is used to clamp the drain voltage at the primary switch to a maximum allowable voltage value to protect the primary switch.

The control scheme being implemented in the flyback converter includes a feedback control loop to monitor the output voltage $V_{OUT}$. The control scheme being applied controls the on-time of the synchronous rectifier or the off-time of the primary switch to maintain the output voltage at the desired voltage value over various load conditions. At a prescribed time, the primary side or secondary side controller of the flyback converter initiates the next switching cycle by turning off the synchronous rectifier and turning on the primary switch. The operation described above repeats.

In the case the flyback converter 10 is operating in the continuous conduction mode, at the prescribed time, such as when the drain voltage has decreased to the predetermined gate turn-off detection threshold $V_{THGOFF}$, the secondary side controller signals the synchronous rectifier to turn off. However, due to the propagation delay and gate driver discharge time, the gate voltage $V_{GS2}$ of the synchronous rectifier M2 is often delayed in turning off the synchronous rectifier switch. As a result, the secondary current Isec experiences negative current or reverse current excursion, as explained in further details with reference to FIG. 6.

Figure 6:
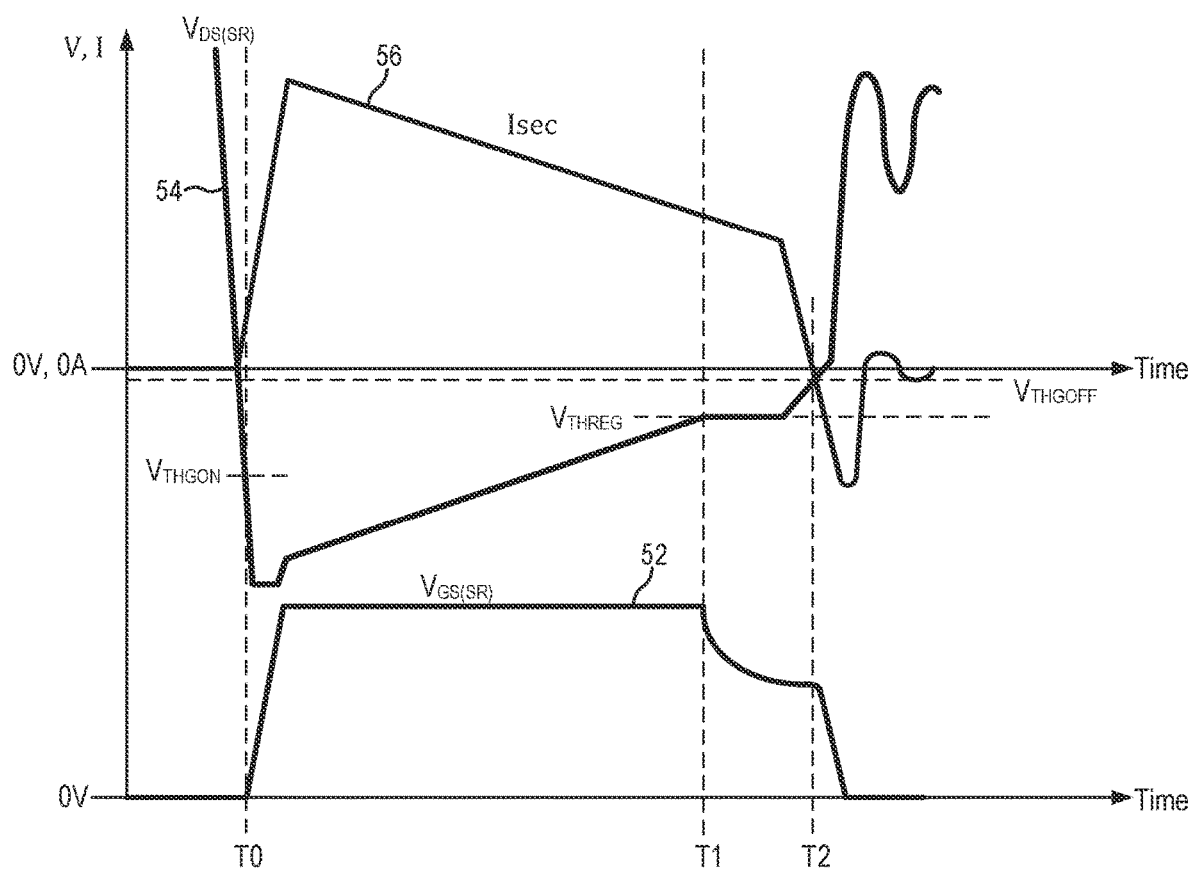
FIG. 6 illustrates signal waveforms in a switching cycle of the synchronous rectifier in the flyback converter of FIG. 4 during the on period of the synchronous rectifier in some examples.

FIG. 6 illustrates signal waveforms in a switching cycle of the synchronous rectifier in the flyback converter of FIG. 4 during the on period of the synchronous rectifier in some examples. Referring to FIG. 6, at time T0 of the switching cycle, the primary switch has turned off and the voltage across the secondary winding has reversed, the secondary current Isec (curve 56), which is also the drain-to-source current or drain current of the synchronous rectifier, conducts through the forward-biased body diode of the synchronous rectifier M2 and the drain voltage $V_{DS(SR)}$ (curve 54) at the drain terminal of the synchronous rectifier M2 drops to a negative voltage value. When the drain voltage $V_{DS(SR)}$ drops to a negative voltage value greater than the SR turn on detection voltage $V_{THGON}$, the synchronous rectifier M2 is signaled to turn on, and the gate voltage $V_{GS(SR)}$ (curve 52) driving the synchronous rectifier is ramped up. The gate voltage $V_{GS(SR)}$ refers to gate voltage $V_{GS2}$ in FIGS. 4 and 5. Accordingly, the synchronous rectifier is turned on and conducts the secondary current Isec to the output capacitor. In practice, the drain voltage $V_{DS}$ of the synchronous rectifier is a function of the secondary current Isec and the on resistance RDSon of the synchronous rectifier switch. In other words, the drain voltage $V_{DS}$ follows the secondary current Isec.

During the on period of the synchronous rectifier, the secondary current Isec conducts current to transfer the energy stored in the secondary winding of the transformer $L_P$ to the output capacitor $C_{OUT}$. As the energy is transferred, the secondary current Isec (or drain current) decreases and the drain voltage $V_{DS(SR)}$ decreases accordingly. In some embodiments, the drain voltage is measured to use as a proxy for the drain current of the synchronous rectifier. In the present example, when the voltage $V_{DS(SR)}$ decreases to the regulation threshold $V_{THREG}$ (time T1), the gate voltage $V_{GS(SR)}$ is regulated to maintain the drain current as the drain current continue to decrease. As long as the gate voltage can be lowered to meet the drain current demand, the drain voltage $V_{DS(SR)}$ is regulated around the regulation voltage level. At time T2, the drain current has decreased to a zero current level and the drain voltage $V_{DS(SR)}$ decreases to the SR turn off detection voltage $V_{THGOFF}$, which signals the synchronous rectifier M2 is to be turned off. However, as a result of the inherent propagation delay in the secondary side controller (FIG. 5) and the time it takes to discharge the gate driver, there is a delay in the synchronous rectifier M2 actually getting turned off. Furthermore, the slope of the secondary current can be quite large during this time period. This result in the secondary current crossing zero current and becoming a negative current (or reverse current), as shown in FIG. 6. When the primary switch (M1) is turned on, the negative secondary current has to be dissipated which causes a large voltage swing on the drain voltage $V_{DS(SR)}$ of the synchronous rectifier (M2). The large voltage swing on the drain voltage $V_{DS(SR)}$ of the synchronous rectifier is not desirable as it may impact the reliability of the synchronous rectifier switch.

Figure 7:
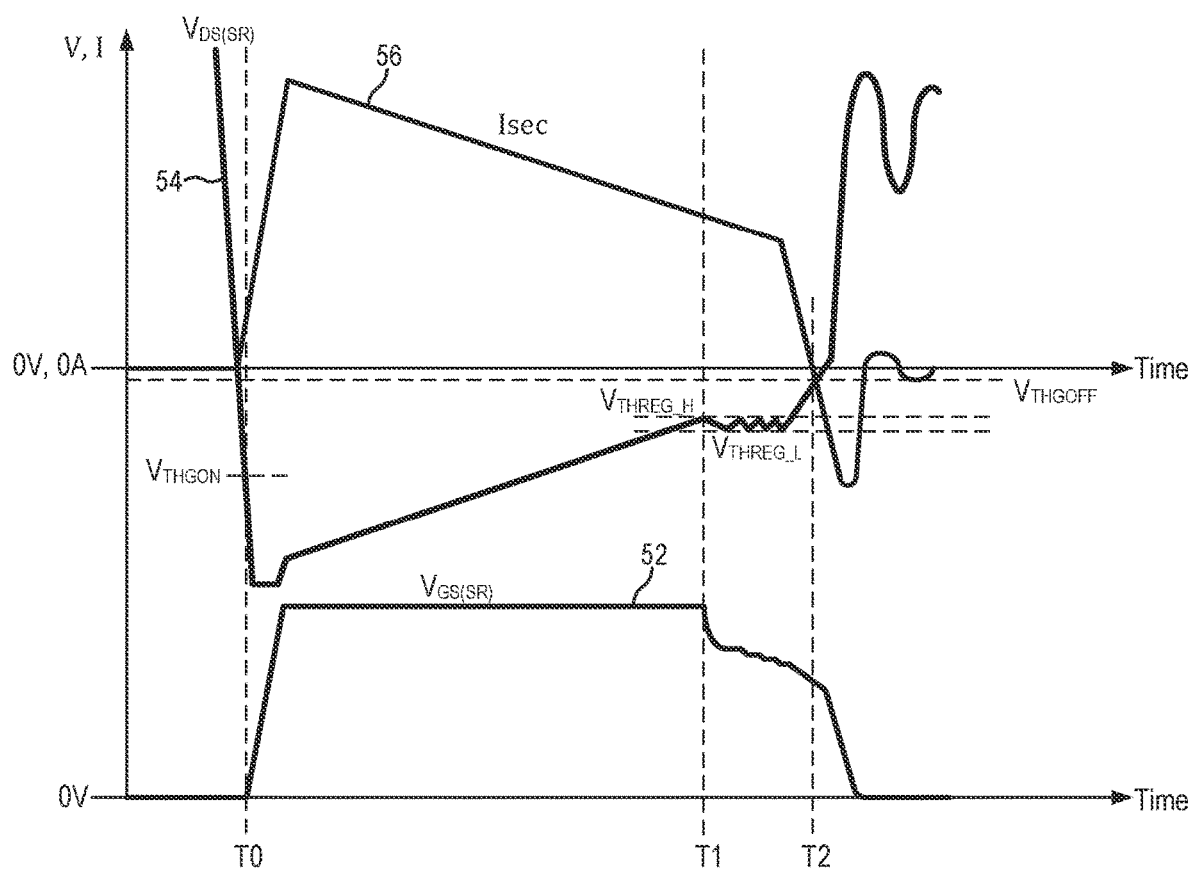
FIG. 7 illustrates signal waveforms in a switching cycle of the synchronous rectifier in the flyback converter of FIG. 4 during the on period of the synchronous rectifier in alternate examples.

FIG. 7 illustrates signal waveforms in a switching cycle of the synchronous rectifier in the flyback converter of FIG. 4 during the on period of the synchronous rectifier in alternate examples. In particular, FIG. 7 illustrates the use of hysteresis in the regulation threshold voltage. In some application, a hysteresis regulation threshold, including a high regulation threshold voltage $V_{THREG\_H}$ and a low regulation threshold voltage $V_{THREG\_L}$, is used to step down the gate voltage while maintaining the decreasing secondary current Isec during the regulation period. The drain voltage $V_{DS}$ of the synchronous rectifier is allowed to ping-pong between the high and low regulation threshold voltages while the gate voltage $V_{GS(SR)}$ of the synchronous rectifier decreases in a stepwise fashion to regulate the secondary current decrease.

In both the control scheme in FIGS. 6 and 7, the SR turn off detection voltage $V_{THGOFF}$ is selected to be very close to 0V. Typically, the SR turn off detection voltage $V_{THGOFF}$ is about −3 mV. The SR turn off detection voltage $V_{THGOFF}$ is set to be close to 0V in order to have shorter dead time between switching cycles. However, with the turn off detection threshold voltage value so close to 0V, and the downward slope of the secondary current being large at that time, the secondary current Isec can develop a large negative current, which results in a large drain voltage swing. The use of the hysteresis regulation threshold does not solve the negative secondary current issue.

In embodiments of the present invention, a power converter, such as a flyback converter, implements an adaptive turn-off voltage control method where the SR turn off detection voltage of the synchronous rectifier is adaptively changed depending on the operating condition of the power converter. When the power converter is operating in the discontinuous conduction mode, the SR turn off detection voltage remains unchanged and close to zero volt to ensure minimal dead time between switching cycles. However, when the power converter is operating in the continuous conduction mode, the SR turn off detection voltage is adjusted to be further away from zero voltage so as to trigger the turning off of the synchronous rectifier earlier in the switching cycle, thereby preventing a large negative secondary current from being developed.

It is instructive to note that in the discontinuous conduction mode, the secondary current decreases slowly, that is, the slope of the secondary current is small. In that case, even when the SR turn off detection voltage is close to zero volt, when the synchronous rectifier is signaled to turn off, there will only be a small amount of negative current. However, in the continuous conduction mode, the secondary current decreases very fast, that is, the slope of the secondary current is large. In that case, when the SR turn off detection voltage is close to zero volt and the synchronous rectifier is signaled to turn off, the secondary current can swing into a large negative current value as a result.

Figure 8:
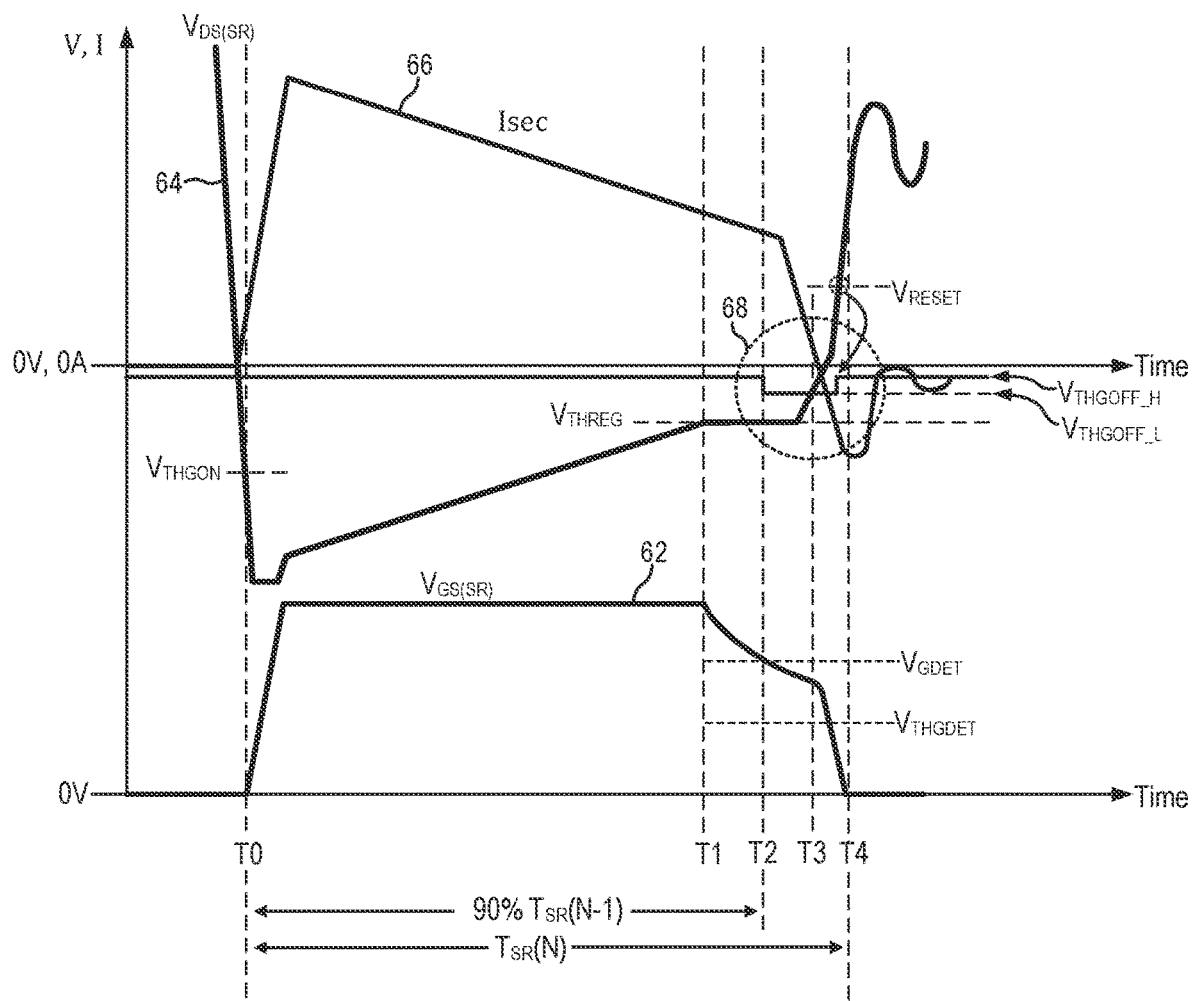
FIG. 8 illustrates signal waveforms in a switching cycle of a synchronous rectifier in a flyback converter implementing the adaptive turn-off voltage control method in embodiments of the present invention.

FIG. 8 illustrates signal waveforms in a switching cycle of a synchronous rectifier in a flyback converter implementing the adaptive turn-off voltage control method in embodiments of the present invention. In some embodiments, the flyback converter is implemented using the topology of the flyback converter 10 of FIG. 4. Referring to FIG. 8, at time T0 of the switching cycle, the drain voltage $V_{DS(SR)}$ (curve 64) of the synchronous rectifier M2 drops to a negative voltage level past the SR turn on detection voltage $V_{THGON}$ which signals the turning on of the synchronous rectifier. The gate voltage $V_{GS(SR)}$ (curve 62) driving the synchronous rectifier is ramped up to turn on the synchronous rectifier. Gate voltage $V_{GS(SR)}$ in FIG. 8 refers to gate voltage $V_{GS2}$ in FIGS. 4 and 5. The synchronous rectifier M2 is turned on and conducts the secondary current Isec (curve 66) to the output capacitor. As described above, the drain voltage $V_{DS(SR)}$ of the synchronous rectifier is a function of the drain current of the synchronous rectifier (which is the secondary current Isec) and the on resistance RDSon of the synchronous rectifier switch. In other words, the drain voltage $V_{DS(SR)}$ follows the drain current Isec.

During the on period of the synchronous rectifier, the secondary current Isec conducts current to transfer the energy stored in the secondary winding of the transformer $L_P$ to the output capacitor $C_{OUT}$. As the energy is transferred, the secondary current Isec decreases and the drain voltage $V_{DS(SR)}$ decreases accordingly. In the present example, when the voltage $V_{DS}$ decreases to the regulation threshold $V_{THREG}$ (time T1), the drain-to-source voltage $V_{DS}$ is regulated around the regulation voltage level and the gate voltage $V_{GS(SR)}$ is reduced instead to regulate the secondary current as the secondary current continue to decrease.

In embodiments of the present invention, the adaptive turn-off voltage control method implements two SR turn off detection voltage values—a first SR turn off detection voltage $V_{THGOFF\_H}$ having a voltage value close to zero volt and a second SR turn off detection voltage $V_{THGOFF\_L}$ having a voltage value farther away from zero volt. In one example, the voltage $V_{THGOFF\_H}$ is −3 mV and the voltage $V_{THGOFF\_L}$ is −30 mV. The adaptive turn-off voltage control method detects the operation mode of the flyback converter. In response to the flyback converter being operated in a discontinuous conduction mode, the method selects the first SR turn off detection voltage $V_{THGOFF\_H}$, which sets the gate turn off threshold close to zero volt. Alternately, in response to the flyback converter being operated in a continuous conduction mode, the method selects the second SR turn off detection voltage $V_{THGOFF\_L}$, which sets the turn off threshold farther away from zero volt. In the present embodiment, the first SR turn off detection voltage $V_{THGOFF\_H}$ is the nominal gate turn off detection voltage and the method switches to the second SR turn off detection voltage $V_{THGOFF\_L}$ when the continuous conduction mode is detected and the method returns to the first SR turn off detection voltage $V_{THGOFF\_H}$ when the drain voltage reaches a predetermined reset voltage value $V_{RESET}$, to prepare the flyback converter for the next switching cycle. In some embodiments, the reset voltage value is a positive voltage, such as 3-4V in some examples.

The adaptive turn-off voltage control method detects the operating mode of the flyback converter at a time T2 being a time near the end of the synchronous rectifier on period. In the example shown in FIG. 8, the method detects the operating mode of the flyback converter at 90% of the expected "on" period (or conduction time) of the synchronous rectifier and determines that the flyback converter is operating in the continuous conduction mode. Accordingly, the gate turn off threshold is switched from the nominal first SR turn off detection voltage $V_{THGOFF\_H}$ to the second SR turn off detection voltage $V_{THGOFF\_L}$. Meanwhile, the secondary current continues to decrease. At time T3, the secondary current decreases to close to a zero current level and the drain voltage $V_{DS}$ reaches the second SR turn off detection $V_{THGOFF\_L}$, which signals the synchronous rectifier M2 is to be turned off. The actual turning off of the synchronous rectifier is delayed as a result of the inherent propagation delay in the secondary side controller (FIG. 5) and the time it takes to discharge the gate driver. At time T4, the synchronous rectifier M2 is actually turned off. At a certain time, (before time T4 in the present example), the drain voltage $V_DS$ has reached a reset threshold voltage $V_{RESET}$ and gate turn off voltage is reset to the nominal first gate off threshold voltage $V_{THGOFF\_H}$ for the next switching cycle.

With the use of the second SR turn off detection voltage $V_{THGOFF\_L}$, the synchronous rectifier M2 is signaled to turn off earlier than would have been with the nominal gate turn off detection threshold ($V_{THGOFF\_H}$). Therefore, the negative current swing of the secondary current is reduced and the corresponding voltage swing on the drain voltage $V_{DS}$ is also reduced. In this manner, the synchronous rectifier switch is protected from stress of undesired or excessive voltage swing and the reliability thereof is improved.

Figure 9:
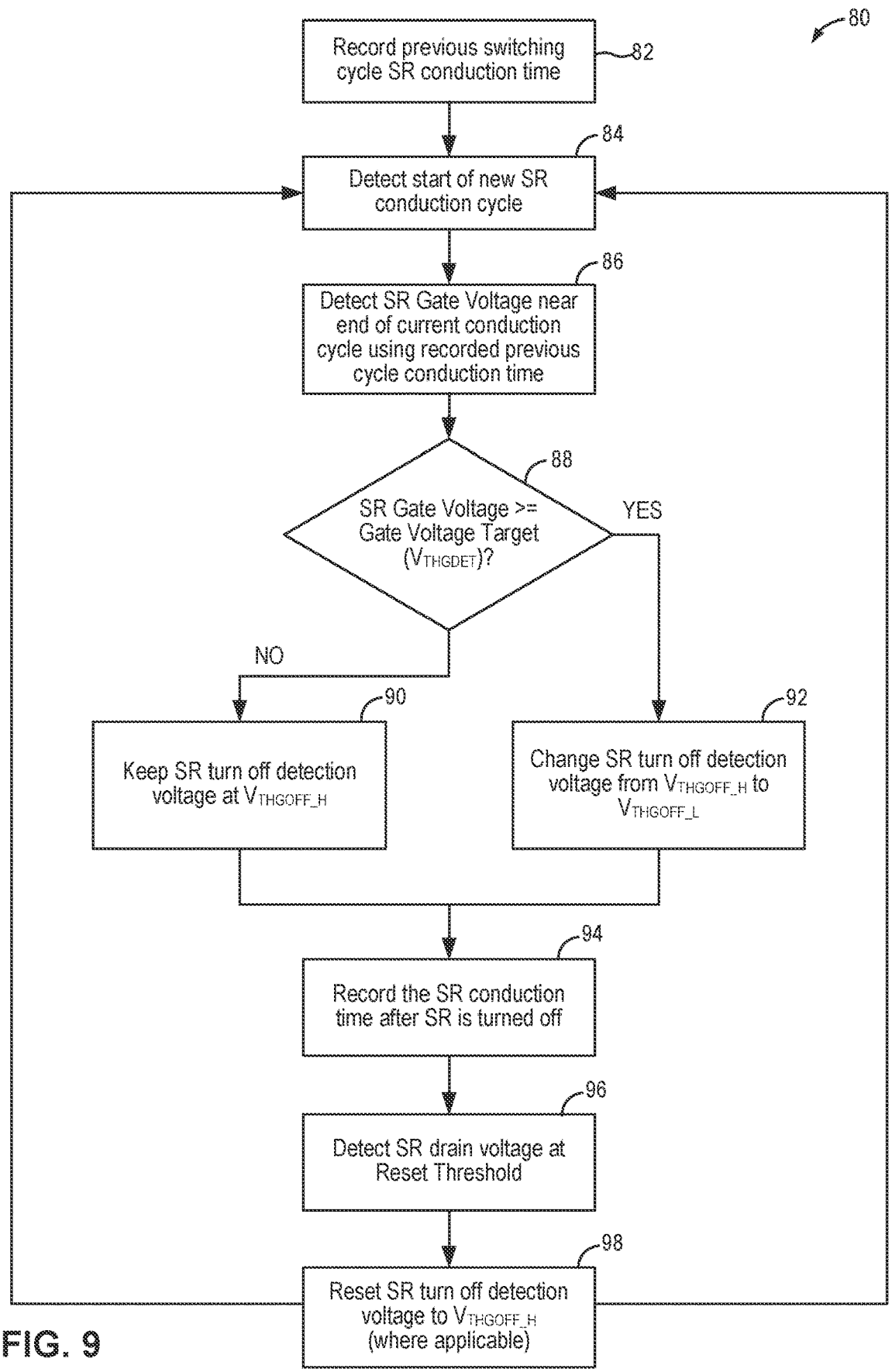
FIG. 9 is a flowchart illustrating the adaptive turn-off voltage control method which can be implemented in a power converter, such as the flyback converter of FIG. 4, in embodiments of the present invention.

The operation of the adaptive turn-off voltage control method of the present invention will be explained in more detail below with reference to FIG. 9. FIG. 9 is a flowchart illustrating the adaptive turn-off voltage control method which can be implemented in a power converter, such as the flyback converter of FIG. 4, in embodiments of the present invention. Referring to FIG. 9, a method 80 has recorded or stored the synchronous rectifier conduction time from a previous switching cycle (82). The method 80 starts by detecting the start of a new SR conduction cycle (84). The method 80 checks the synchronous rectifier gate voltage $V_{GS(SR)}$ near the end of the current SR conduction cycle. In embodiments of the present invention, the method 80 determines the flyback converter operation has nearly reached the end of the current SR conduction cycle by using the recorded SR conduction time of the previous switching cycle as a proxy and taking X % of the SR conduction time of the previous switching cycle to indicate the near end of the current SR conduction cycle. That is, the method 80 uses X % of the recorded SR conduction time of the previous switching cycle as the gate detection time in the current conduction cycle. In some examples, X % is 90% or between 85% to 95%. In practice, the operating frequency of the flyback converter is relatively constant and thus the SR conduction time from cycle to cycle will be relatively constant. Accordingly, in one embodiment, at a time in the current SR conduction cycle that is 90% of the conduction time of the previous SR conduction cycle, the method 80 detects the synchronous rectifier gate voltage $V_{GS(SR)}$ (86). Referring to FIG. 8, in the current SR conduction cycle N, the time T2 is associated with 90% of the SR conduction time of the previous SR conduction cycle N−1, denoted as 90% of $T_{SR}$(N−1).

The method 80 compares the detected gate voltage, denoted as $V_{GDET}$ in FIG. 8, with a gate voltage target $V_{THGDET}$ and determines whether the detected gate voltage $V_{GDET}$ is greater than or equal to the gate voltage target $V_{THGDET}$ (88). In the event that the detected gate voltage $V_{GDET}$ is less than the gate voltage target $V_{THGDET}$, the method determines that the flyback converter is operating in the discontinuous conduction mode and the method keeps the SR turn off detection voltage at the high detection level $V_{THGOFF\_H}$, closer to zero volt (90). In the event that the detected gate voltage $V_{GDET}$ is greater than or equal to the gate voltage target $V_{THGDET}$, the method determines that the flyback converter is operating in the continuous conduction mode and the method changes the SR turn off detection voltage to the low detection level $V_{THGOFF\_L}$, farther from zero volt (92).

In particular, in embodiments of the present invention, the adaptive turn-off voltage control method 80 uses the gate voltage of the synchronous rectifier as a proxy for the operating state of the flyback converter. When the flyback converter is operated in the discontinuous conduction mode (DCM), the gate voltage of the synchronous rectifier would be very small at the end of the conduction cycle. That is, in the discontinuous conduction mode, the gate voltage $V_{GS(SR)}$ of the synchronous rectifier would be less than the gate voltage target $V_{THGDET}$. On the other hand, when the flyback converter is operated in the continuous conduction mode (CCM), the gate voltage of the synchronous rectifier would still be large at the end of the conduction cycle. That is, in the continuous conduction mode, the gate voltage $V_{GS(SR)}$ of the synchronous rectifier would be greater than or at least equal to the gate voltage target $V_{THGDET}$. In some examples, the gate voltage target $V_{THGDET}$ is 3.5-4V for the flyback converter but can have different voltage values depending on the power converter topology and other operating conditions.

Therefore, by detecting the gate voltage $V_{GS(SR)}$ of the synchronous rectifier at the near end of the SR conduction cycle and comparing the detected gate voltage $V_{GDET}$ to the gate voltage target, the method 80 can determine the operating mode of the flyback converter and can set the SR turn off detection voltage accordingly to realize fast turn off of the synchronous rectifier when operated in the continuous conduction mode. After the SR turn off detection voltage is appropriately selected (90 or 92), the flyback converter operates to turn off the synchronous rectifier when the drain voltage reaches the selected SR turn off detection voltage. At the end of the SR conduction cycle, the method 80 records or stores the SR conduction time of the current SR conduction cycle after the synchronous rectifier is turned off (94). Meanwhile, the method 80 further detects the drain voltage $V_{DS(SR)}$ of the synchronous rectifier to determine if the drain voltage $V_{DS(SR)}$ has reached the reset threshold voltage $V_{RESET}$ (96). When the drain voltage $V_{DS(SR)}$ has reached the reset threshold voltage $V_{RESET}$, the method 80 resets the SR turn off detection voltage to the high detection level $V_{THGOFF\_H}$, closer to zero volt (98), where applicable. It is understood that in the case the SR turn off detection voltage has not changed to the low detection level $V_{THGOFF\_L}$, then there is no need to reset the gate turn off threshold voltage as it is already at the high detection level $V_{THGOFF\_H}$, which is the nominal detection level.

The method 80 then returns to detecting the start of the next synchronous rectifier conduction cycle (84). The process continues again to detect the gate voltage of the synchronous rectifier at near end of the conduction cycle to determine the operating mode and to adaptively adjust the SR turn off detection voltage based on the detected operating mode. By changing the SR turn off detection voltage to a lower voltage value (e.g. −30 mV vs. −3 mV) when the flyback converter is detected to be operating in the continuous conduction mode, the synchronous rectifier is signaled to turn off earlier in the conduction time, which has the effect of reducing the amount of negative secondary current excursion as well as the amount of drain voltage swing on the synchronous rectifier. Importantly, the method 80 changes the SR turn off detection voltage only for the continuous conduction mode, keeping the SR turn off detection voltage at the nominal level for the discontinuous conduction mode. In this manner, the SR turn off detection voltage can stay close to zero volt to avoid excessive dead time between switching cycles. Meanwhile, fast synchronous rectifier turn off is realized by moving the SR turn off detection voltage away from zero voltage.

Figure 10:
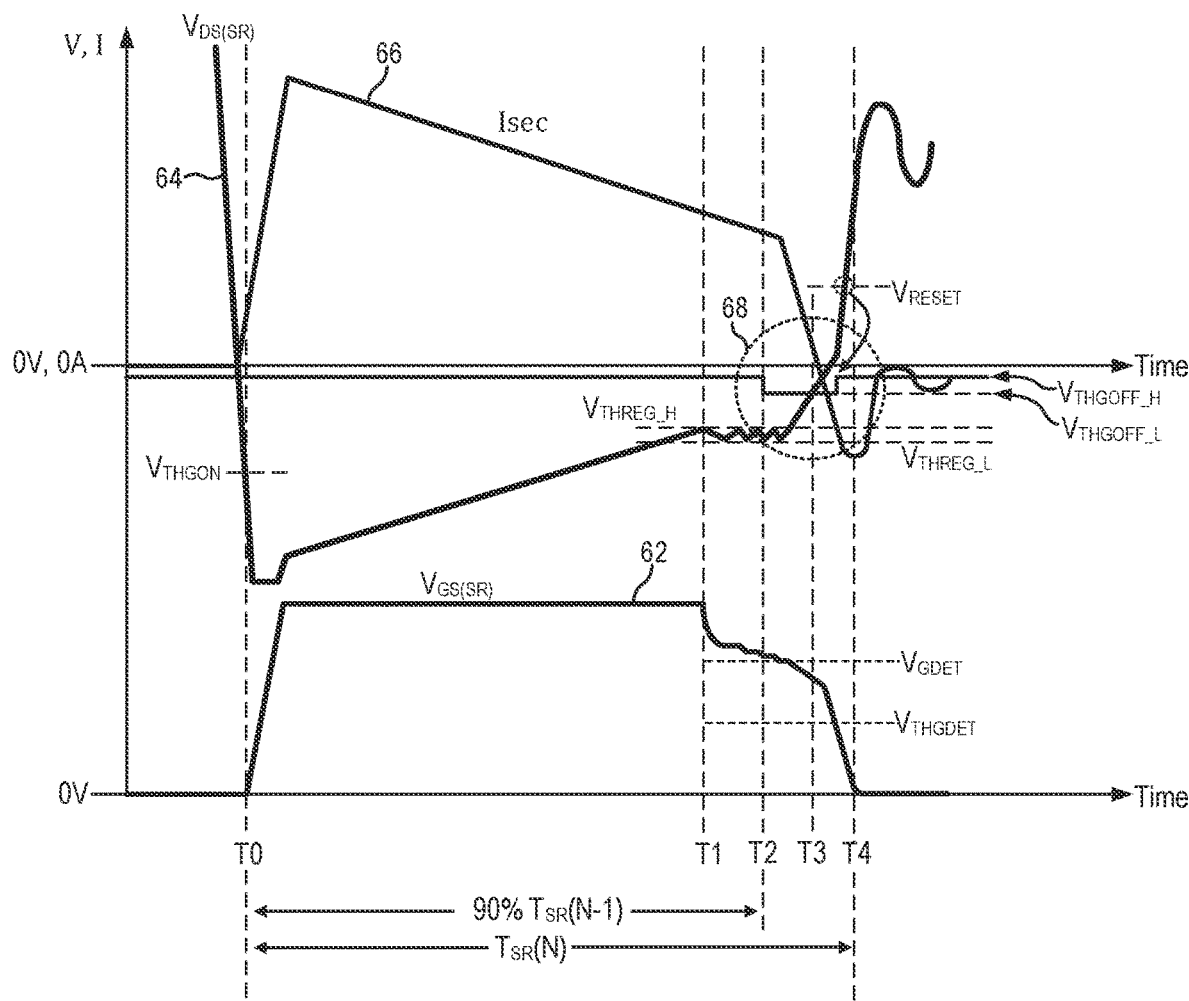
FIG. 10 illustrates signal waveforms in a switching cycle of a synchronous rectifier in a flyback converter implementing the adaptive turn-off voltage control method in embodiments of the present invention.

FIG. 10 illustrates signal waveforms in a switching cycle of a synchronous rectifier in a flyback converter implementing the adaptive turn-off voltage control method in embodiments of the present invention. In particular, FIG. 10 illustrates the use of hysteresis in the regulation threshold voltage in conjunction with the adaptive turn-off voltage control method. The hysteresis regulation threshold, including a high regulation threshold voltage $V_{THREG\_H}$ and a low regulation threshold voltage $V_{THREG\_L}$, is used to better regulate the secondary current Isec during the regulation period. The drain voltage $V_{DS(SR)}$ is allowed to ping-pong between the high and low regulation threshold voltages while the gate voltage $V_{GS(SR)}$ of the synchronous rectifier decreases in a stepwise fashion to regulate the secondary current decrease. The use of the hysteresis regulation threshold does not change the operation of the adaptive turn-off voltage control method of the present invention. In particular, the method detects the gate voltage $V_{GS(SR)}$ at time T2, being 90% of the SR conduction time recorded from the previous switching cycle. When the method determines that the gate voltage $V_{GS(SR)}$ is greater than the gate voltage target $V_{THGDET}$, the SR turn off detection voltage is changed to the lower voltage value $V_{THGOFF\_L}$ to allow the synchronous rectifier turn-off detection to occur sooner, as explained above. The gate turn off threshold is reset to the nominal turn off voltage $V_{THGOFF\_H}$ when the drain voltage $V_{DS(SR)}$ reaches the reset threshold voltage $V_{RESET}$.

Figure 11:
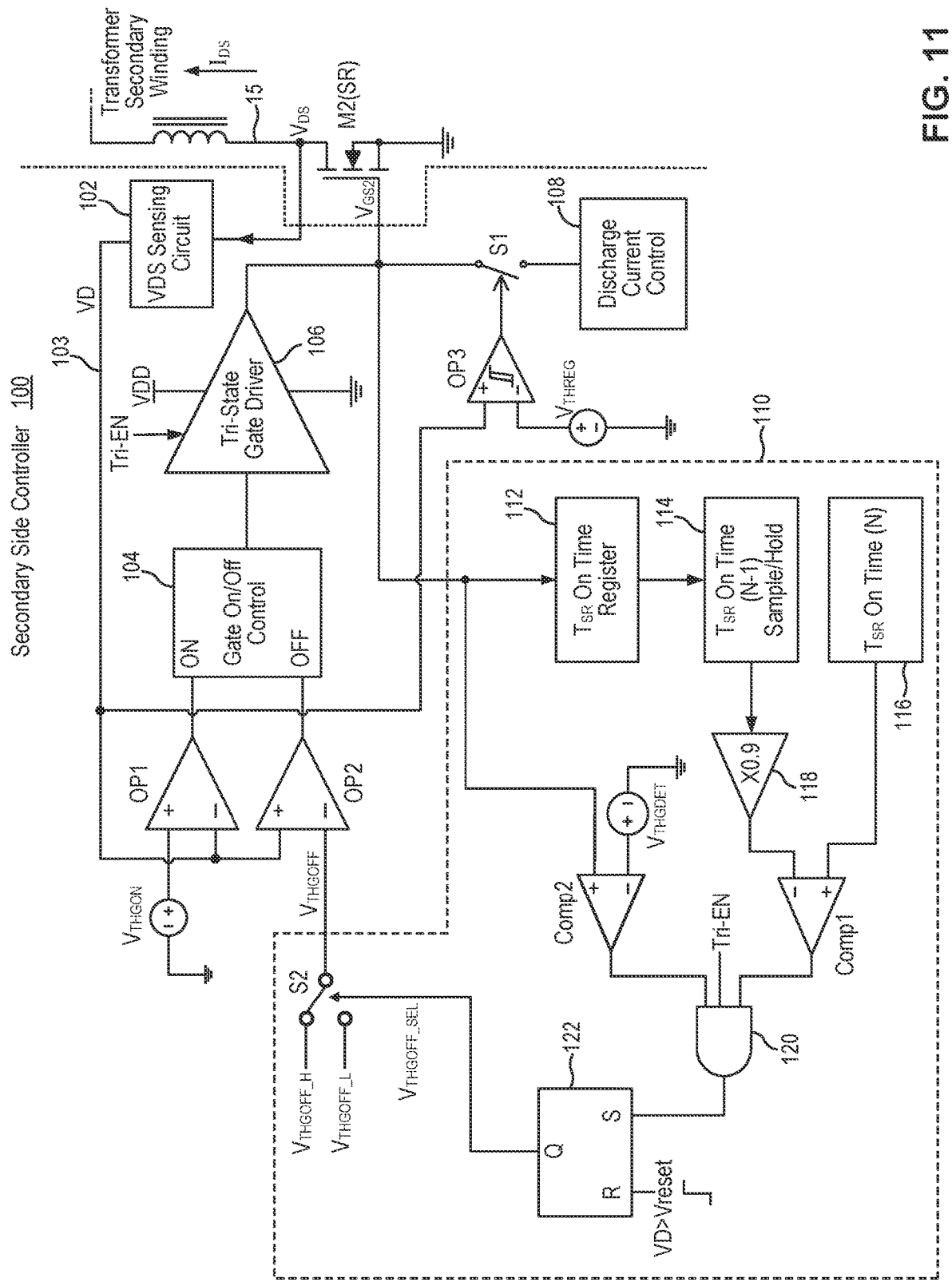
FIG. 11 is a schematic diagram of a secondary side controller in the flyback converter of FIG. 4 incorporating an adaptive turn-off voltage control circuit in embodiments of the present invention.

FIG. 11 is a schematic diagram of a secondary side controller in the flyback converter of FIG. 4 incorporating an adaptive turn-off voltage control circuit in embodiments of the present invention. In some embodiments, the adaptive turn-off voltage control circuit implements the adaptive turn-off voltage control method of FIG. 9. Referring to FIG. 11, a secondary side controller 100 for generating the gate voltage $V_{GS2}$ to control the synchronous rectifier MOSFET M2 includes a drain voltage VDS sensing circuit 102 for sensing the drain voltage $V_{DS}$ of the synchronous rectifier M2. The sensed or detected drain voltage VD (node 103) is coupled to a pair of operational amplifier OP1 and OP2, to be compared with respective detection threshold voltages to generate the gate on/off control signal for the synchronous rectifier M2. In particular, the operational amplifier OP1 compares the sensed drain voltage VD (node 103) to a SR turn on detection voltage $V_{THGON}$ to determine when the synchronous rectifier M2 should be turned on and the operational amplifier OP2 compares the sensed drain voltage VD (node 103) to a SR turn off detection voltage $V_{THGOFF}$ to determine when the synchronous rectifier M2 should be turned off. The secondary side controller 100 includes a gate on/off control logic circuit 104 which receives the output signals from the operational amplifiers OP1 and OP2 and generate the on/off control signal. The on/off control signal is coupled to a tri-state gate driver 106, which when enabled by the enable signal Tri-EN, provides the gate voltage $V_{GS2}$ to drive the synchronous rectifier M2.

In the present example, the secondary side controller 100 further includes an operational amplifier OP3 for comparing the sensed drain voltage VD (node 103) to a regulation threshold voltage $V_{THREG}$. When the sensed drain voltage VD (node 103) reaches the regulation threshold voltage $V_{THREG}$, the operational amplifier OP3 closes switch S1 to allow a discharge current control circuit 108 to discharge the gate voltage $V_{GS2}$ in a controlled fashion. In particular, when the detected drain voltage VD (node 103) decreases to the regulation threshold $V_{THREG}$, the drain-to-source voltage $V_{DS}$ of the synchronous rectifier is regulated around the regulation voltage level while the gate voltage $V_{GS2}$ is reduced by the discharge current control circuit 108. In other words, the gate voltage $V_{GS2}$ is reduced in order to regulate the secondary current flowing in the secondary winding as the secondary current continue to decrease during the synchronous rectifier conduction cycle, as shown in FIG. 8. Additional operational amplifier may be used to provide additional regulation threshold, such as when hysteresis regulation is desired.

The secondary side controller 100 further includes an adaptive turn-off voltage control circuit 110 to select the desired voltage value for the SR turn off detection voltage. The control circuit 110 includes a register 112 used to store the SR conduction time $T_{SR}$ at each synchronous rectifier conduction cycle. The SR conduction time $T_{SR}(N-1)$ for the previous conduction cycle is sampled or captured by a sample and hold circuit 114. The sampled SR conduction time $T_{SR}(N-1)$ is multiplied at a multiplier 118 by a multiplication factor close to but less than 1 to generate a factored SR conduction time. In the present example, the multiplier 118 multiplies the sampled SR conduction time $T_{SR}(N-1)$ by 0.9 to obtain 90% of the previous cycle SR conduction time. In other embodiments, other multiplication factor can be used. For example, the multiplication factor of multiplier 118 can be between 0.85 to 0.95. Meanwhile, a register 116 stores the time value of the current progress of the SR conduction time $T_{SR}(N)$ in the current conduction cycle. At a comparator Comp1, the SR conduction time $T_{SR}(N)$ is compared with the factored SR conduction time from the multiplier 118. The comparator Comp1 asserts its output when the current conduction time reaches the factored SR conduction time. That is, the comparator Comp1 asserts its output when the conduction time if the current SR conduction cycle reaches 90% of the conduction time of the previous SR conduction cycle.

The output of the comparator Comp1 is provided as an input to a logical AND gate 120. Logical AND gate 120 operates on three inputs and asserts its output when the conditions associated with the three inputs are met. The first input to the logical AND gate 120 is the output of the comparator Comp1 indicating whether the SR conduction time of the current SR conduction cycle has reached nearly the end of the conduction cycle, as indicated by whether the SR conduction time has reached 90% of the conduction time of the previous SR conduction cycle. The second input to the logical AND gate 120 is the enable signal Tri-EN for enabling the tri-state gate driver 106. The third input to the logical AND gate 120 is the output of a comparator Comp2 which compares the gate voltage $V_{GS2}$ of the synchronous rectifier to the gate voltage target $V_{THGDET}$. The logical AND gate 120 asserts its output when three conditions are met: (1) the SR conduction time has reach 90% of the conduction time of the previous SR conduction cycle; (2) the enable signal Tri-En for the tri-state gate driver is enabled; and (3) the gate voltage $V_{GS2}$ of the synchronous rectifier is equal to or greater than the gate voltage target $V_{THGDET}$. When the three conditions are met, the adaptive turn-off voltage control circuit 110 determines that the flyback converter is operating in the continuous conduction mode. When any one of the three conditions is not met, the adaptive turn-off voltage control circuit 110 determines that the flyback converter is operating in the discontinuous conduction mode.

In alternate embodiments, the logical AND gate 120 may omit the enable signal Tri-En as an input and only evaluates the remaining two conditions: 90% conduction time and gate voltage at gate voltage target. In the case the tri-state gate driver 106 is not enabled (enable signal Tri-En not asserted), the synchronous rectifier M2 is not being driven anyway and the operation of the adaptive turn-off voltage control circuit 110 is irrelevant. The use of the enable signal Tri-En at the logical AND gate 120 in FIG. 11 is illustrative only.

The adaptive turn-off voltage control circuit 110 includes a set-reset (SR) flip-flop 122. The set input terminal of the SR flip-flop 122 receives the output of the logical AND gate 120. Thus, when the conditions evaluated by the logical AND gate are met, the set input of the SR flip-flop 122 is asserted and the output (Q) of the flip-flop is asserted (e.g.

logical "1"). The reset input terminal of the SR flip-flop 122 receives a signal indicative of the comparison of the drain voltage VD (node 103) of the synchronous rectifier and the reset threshold voltage $V_{RESET}$. The reset input of the SR flip-flop 122 is asserted when the sensed drain voltage VD (node 103) reaches the reset threshold voltage $V_{RESET}$. When the reset input of the SR flip-flop 122 is asserted, the output (Q) of the flip-flop 122 is deasserted (e.g. logical "0"). The output (Q) of the SR flip-flop 122 is a detection voltage selection signal $V_{THGOFF\_SEL}$ and is coupled to control a switch S2 to select one of two detection voltages.

In particular, when the SR flip-flop 122 is set and the detection voltage selection signal $V_{THGOFF\_SEL}$ is asserted (e.g. logical "1"), the switch S2 selects the low SR turn off detection voltage $V_{THGOFF\_L}$. On the other hand, when the SR flip-flop 122 is reset and the detection voltage selection signal $V_{THGOFF\_SEL}$ is deasserted (e.g. logical "0"), the switch S2 selects the high SR turn off detection voltage $V_{THGOFF\_H}$. The switch S2 provides the selected detection voltage as the SR turn off detection voltage $V_{THGOFF}$ which is provided to the operational amplifier OP2. In this manner, the adaptive turn-off voltage control circuit 110 detects the flyback converter is operating in the continuous conduction mode and selects the low SR turn off detection voltage $V_{THGOFF\_L}$ for faster turn off of the synchronous rectifier. Alternately, the adaptive turn-off voltage control circuit 110 detects the flyback converter is operating in the discontinuous conduction mode and selects or keeps the high SR turn off detection voltage $V_{THGOFF\_H}$ to ensure short deadtime between switching cycles. At the end of the current SR conduction cycle, the adaptive turn-off voltage control circuit 110 stores the SR conduction time in the register 112 for use in the next switching cycle.

As thus configured, the adaptive turn-off voltage control circuit 110 operates to select adaptively the SR turn off detection voltage as a function of the operation mode in which the flyback converter is operating. The flyback converter can realize fast synchronous rectifier turn off, which has the effect of reducing negative current excursion on the secondary current and reducing large voltage swing on the drain voltage of the synchronous rectifier as a result.

In the above description, a flyback converter including a transformer is described. It is understood that the adaptive turn-off voltage control circuit and method can be applied to other types of power converters or switching regulators, with or without transformer isolation. The terms "primary current" and "secondary current" as used herein refer to the current flowing through the primary switch and the current flowing through the synchronous rectifier, respectively. The use of a transformer isolated power converter in the present description is illustrative only and not intended to be limiting.

In this detailed description, process steps described for one embodiment may be used in a different embodiment, even if the process steps are not expressly described in the different embodiment. When reference is made herein to a method including two or more defined steps, the defined steps can be carried out in any order or simultaneously, except where the context dictates or specific instruction otherwise are provided herein. Further, unless the context dictates or express instructions otherwise are provided, the method can also include one or more other steps carried out before any of the defined steps, between two of the defined steps, or after all the defined steps In this detailed description, various embodiments or examples of the present invention may be implemented in numerous ways, including as a process; an apparatus; a system; and a composition of matter. A detailed description of one or more embodiments of the invention is provided above along with accompanying figures that illustrate the principles of the invention. The invention is described in connection with such embodiments, but the invention is not limited to any embodiment. Numerous modifications and variations within the scope of the present invention are possible. The scope of the invention is limited only by the claims and the invention encompasses numerous alternatives, modifications, and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured. The present invention is defined by the appended claims.

The invention claimed is:

1. A method of operating a power converter incorporating a synchronous rectifier and receiving an input voltage and providing an output voltage, the method comprising:
   detecting a start of a synchronous rectifier (SR) conduction cycle;
   detecting a gate voltage at a gate terminal of the synchronous rectifier near an end of the SR conduction cycle;
   in response to the detected gate voltage being less than a gate voltage target, selecting a first SR turn off detection voltage as a SR turn off detection threshold;
   in response to the detected gate voltage being greater than or equal to the gate voltage target, selecting a second SR turn off detection voltage as the SR turn off detection threshold, the first and second SR turn off detection voltages being negative voltage values and the first SR turn off detection voltage is closer to zero volt than the second SR turn off detection voltage;
   in response to the synchronous rectifier being turned off in response to a drain voltage of the synchronous rectifier reaching the SR turn off detection threshold, storing the SR conduction time of the current SR conduction cycle; and
   in response to the SR turn off detection threshold being set to the second SR turn off detection voltage, resetting the SR turn off detection threshold to the first SR turn off detection voltage.

2. The method of claim 1, wherein resetting the SR turn off detection threshold comprises:
   in response to the SR turn off detection threshold being set to the second SR turn off detection voltage, detecting the drain voltage of the synchronous rectifier; and
   in response to the detected drain voltage having reached a reset threshold voltage, setting the SR turn off detection threshold to the first SR turn off detection voltage.

3. The method of claim 2, wherein the reset threshold voltage comprises a positive voltage value.

4. The method of claim 1, wherein detecting the gate voltage at the gate terminal of the synchronous rectifier near an end of the SR conduction cycle comprises:
   sampling the stored SR conduction time of the previous SR conduction cycle;
   determining a gate detection time being X % of the SR conduction time of the previous SR conduction cycle; and
   detecting the gate voltage at the gate terminal of the synchronous rectifier at the gate detection time.

5. The method of claim 4, wherein the X % comprises a value between 85% to 95%.

6. The method of claim 4, further comprising:
repeating detecting the start of the SR conduction cycle to resetting the SR turn off detection threshold for the next SR conduction cycle, the stored SR conduction time becoming the stored SR conduction time of the previous SR conduction cycle.

7. The method of claim 1, wherein the power converter comprises a flyback converter, the flyback converter comprising a transformer having a primary winding receiving the input voltage and a secondary winding providing the output voltage, a primary switch coupled to the primary winding and the synchronous rectifier coupled to the secondary winding.

8. The method of claim 1, wherein the first SR turn off detection voltage comprises-3 mV and the second SR turn off detection voltage comprises-30 mV.

9. The method of claim 1, wherein the power converter is operating in a discontinuous conduction mode in response to the detected gate voltage being less than the gate voltage target and the power converter is operating in a continuous conduction mode in response to the detected gate voltage being great than or equal to the gate voltage target.

10. A power converter, comprising:
an input terminal receiving an input voltage and an output terminal providing an output voltage;
a synchronous rectifier coupled to the output terminal;
a controller coupled to generate a gate voltage to drive a gate terminal of the synchronous rectifier over a plurality of synchronous rectifier (SR) conduction cycles,
wherein the controller detects the gate voltage at the gate terminal of the synchronous rectifier near an end of each SR conduction cycle, the controller setting a SR turn off detection threshold to a first voltage in response to the detected gate voltage having a value less than a gate voltage target and setting the SR turn off detection threshold to a second voltage in response to the detected gate voltage having a value greater than the gate voltage target, the first and second voltages being negative voltage values and the first voltage is closer to zero volt than the second voltage, the controller using the SR turn off detection threshold to determine the turning off of the synchronous rectifier, and in response to the controller signaling the synchronous rectifier to turn off in response to the SR turn off detection threshold, the controller reset the SR turn off detection threshold to the first voltage in the case the SR turn off detection threshold has been set to the second voltage.

11. The power converter of claim 10, wherein in response to the SR turn off detection threshold being set to the second voltage, the controller detects a drain voltage at a drain terminal of the synchronous rectifier and in response to the detected drain voltage having reached a reset threshold voltage, the controller set the SR turn off detection threshold to the first SR turn off detection voltage.

12. The power converter of claim 11, wherein the reset threshold voltage comprises a positive voltage value.

13. The power converter of claim 11, wherein the controller comprises:
a drain voltage detect circuit coupled to detect the drain voltage at the drain terminal of the synchronous rectifier;
a first operational amplifier having a first input terminal coupled to receive the detected drain voltage and a second input terminal coupled to receive a SR turn on threshold, the first operational amplifier having an output terminal and asserting an output signal on the output terminal in response to the detected drain voltage being more negative than the SR turn on threshold;
a second operational amplifier having a first input terminal coupled to receive the SR turn off threshold and a second input terminal coupled to receive the detected drain voltage, the second operational amplifier having an output terminal and asserting an output signal on the output terminal in response to the detected drain voltage being greater than the SR turn off threshold; and
a gate control circuit receiving the output signals of the first and second operational amplifier and driving a gate driver in response to the output signals indicating the synchronous rectifier is to be turned on or turned off, the gate driver generating the gate voltage to drive the gate terminal of the synchronous rectifier.

14. The power converter of claim 13, wherein the controller further comprises:
a first register configured to store the SR conduction time of the previous SR conduction cycle;
a sample and hold circuit configured to sample the stored SR conduction time;
a multiplier configured to multiply the stored SR conduction by X % to determine a gate detection time;
a second register configured to store a time value of the conduction time in progress in the current conduction cycle;
a first comparator comparing the gate detection time and the time value stored in the second register, the first comparator asserting a comparator output signal in response to the time value stored in the second register being equal to the gate detection time, the comparator output signal being deasserted otherwise;
a second comparator comparing the detected gate voltage to the gate voltage target, the second comparator asserting a comparator output signal in response to the gate voltage being greater than the gate voltage target, the comparator output signal being deasserted otherwise;
a logical AND gate configured to receive the comparator output signals of the first comparator and the second comparator, the logical AND gate asserting an output signal in response to the comparator output signals being asserted, the output signal being deasserted otherwise;
a set-reset flip-flop having a set input terminal receiving the output signal of the logical AND gate, a reset terminal receiving a reset signal being asserted in response to the detected drain voltage having reached the reset threshold voltage, the set-reset flip-flop generating a selection signal at an output signal, the selection signal being set in response to the output signal of the logical AND gate being asserted and being reset in response to the reset signal being asserted; and
a switch controlled by the selection signal to select the first voltage or the second voltage as the SR turn off detection threshold, the switch selecting the first voltage in response the selection signal being reset and selecting the second voltage in response to the selection signal being set.

15. The power converter of claim 10, wherein the controller detects the gate voltage at the gate terminal of the synchronous rectifier near the end of each SR conduction cycle by sampling a stored SR conduction time of the previous SR conduction cycle and determining a gate detection time being X % of the SR conduction time of the previous SR conduction cycle, the controller detecting the gate voltage at the gate terminal of the synchronous rectifier at the gate detection time.

16. The power converter of claim 15, wherein the X % comprises a value between 85% to 95%.

17. The power converter of claim 15, wherein the controller stores the SR conduction time of the current SR conduction cycle after the synchronous rectifier is turned off in response to the drain voltage of the synchronous rectifier reaching the SR turn off detection threshold, and the controller repeats detecting the gate voltage to resetting the SR turn off detection threshold for the next SR conduction cycle, the stored SR conduction time becoming the stored SR conduction time of the previous SR conduction cycle.

18. The power converter of claim 10, wherein the power converter comprises a flyback converter comprising:
- a transformer having a primary winding receiving the input voltage and a secondary winding providing the output voltage;
- a primary switch coupled to the primary winding;
- the synchronous rectifier coupled to the secondary winding;
- an output capacitor coupled across the secondary winding; and
- a primary side controller coupled to generate control signals to drive the primary switch.

19. The power converter of claim 10, wherein the first voltage comprises-3 mV and the second voltage comprises-30 mV.

20. The power converter of claim 10, wherein the power converter is operating in a discontinuous conduction mode in response to the detected gate voltage being less than the gate voltage target and the power converter is operating in a continuous conduction mode in response to the detected gate voltage being great than or equal to the gate voltage target.

* * * * *